July 28, 1959 R. R. HAUSE 2,896,587
HYDRO-PNEUMATIC ACTUATOR FOR A MOTOR-DRIVEN SPINDLE
Filed Nov. 12, 1953 8 Sheets-Sheet 1
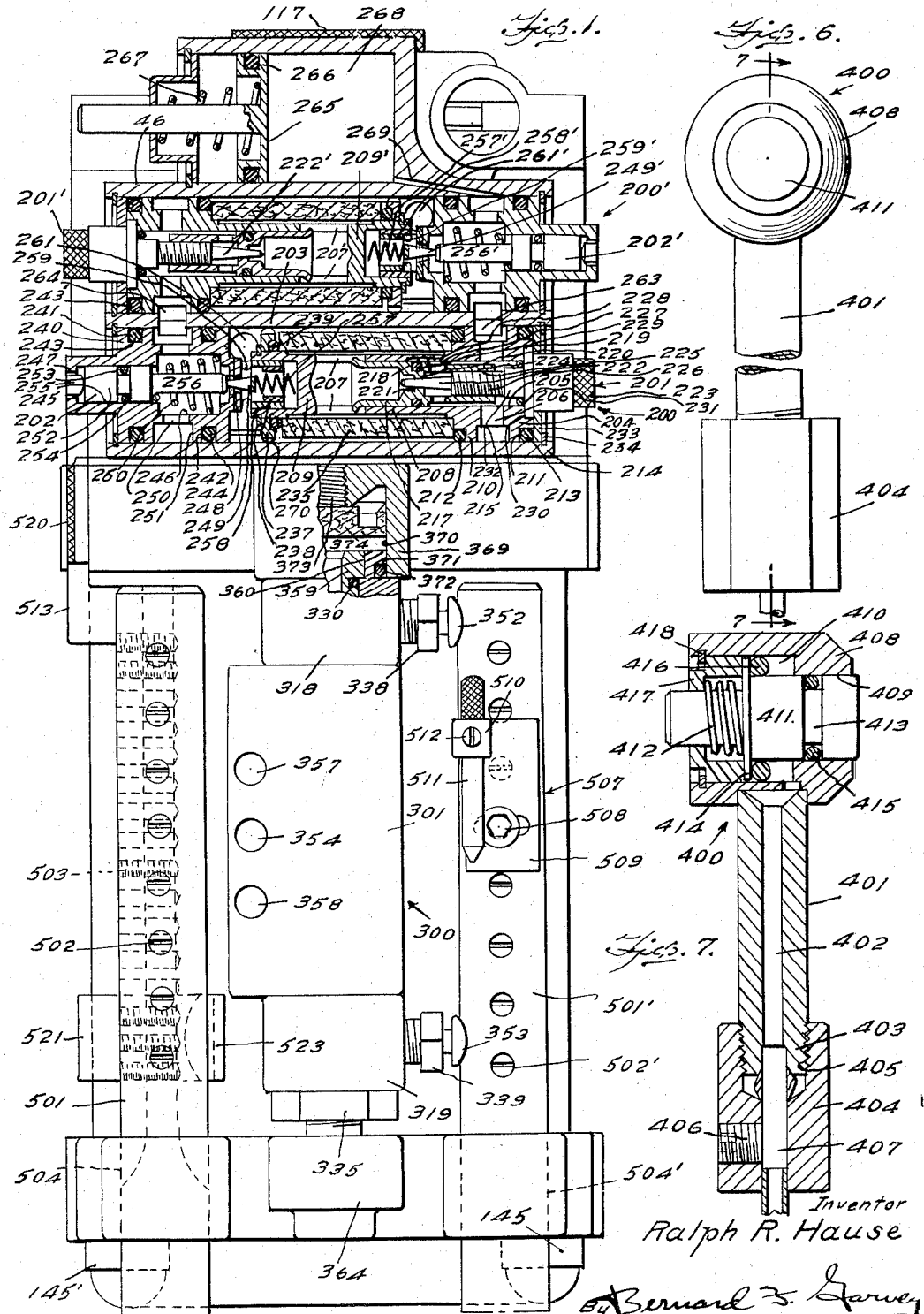
Inventor
Ralph R. Hause
By Bernard F. Garvey
ATTY.

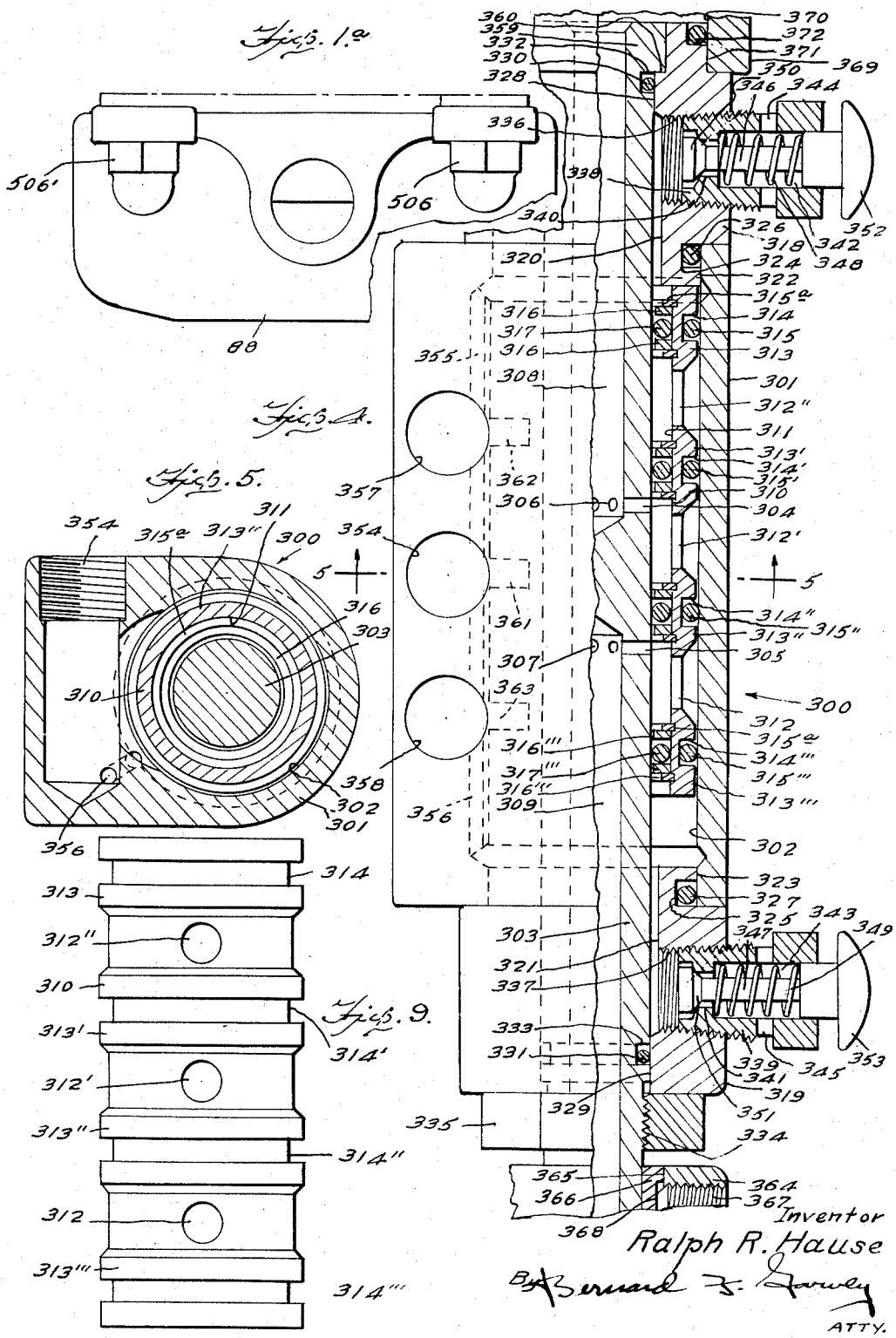

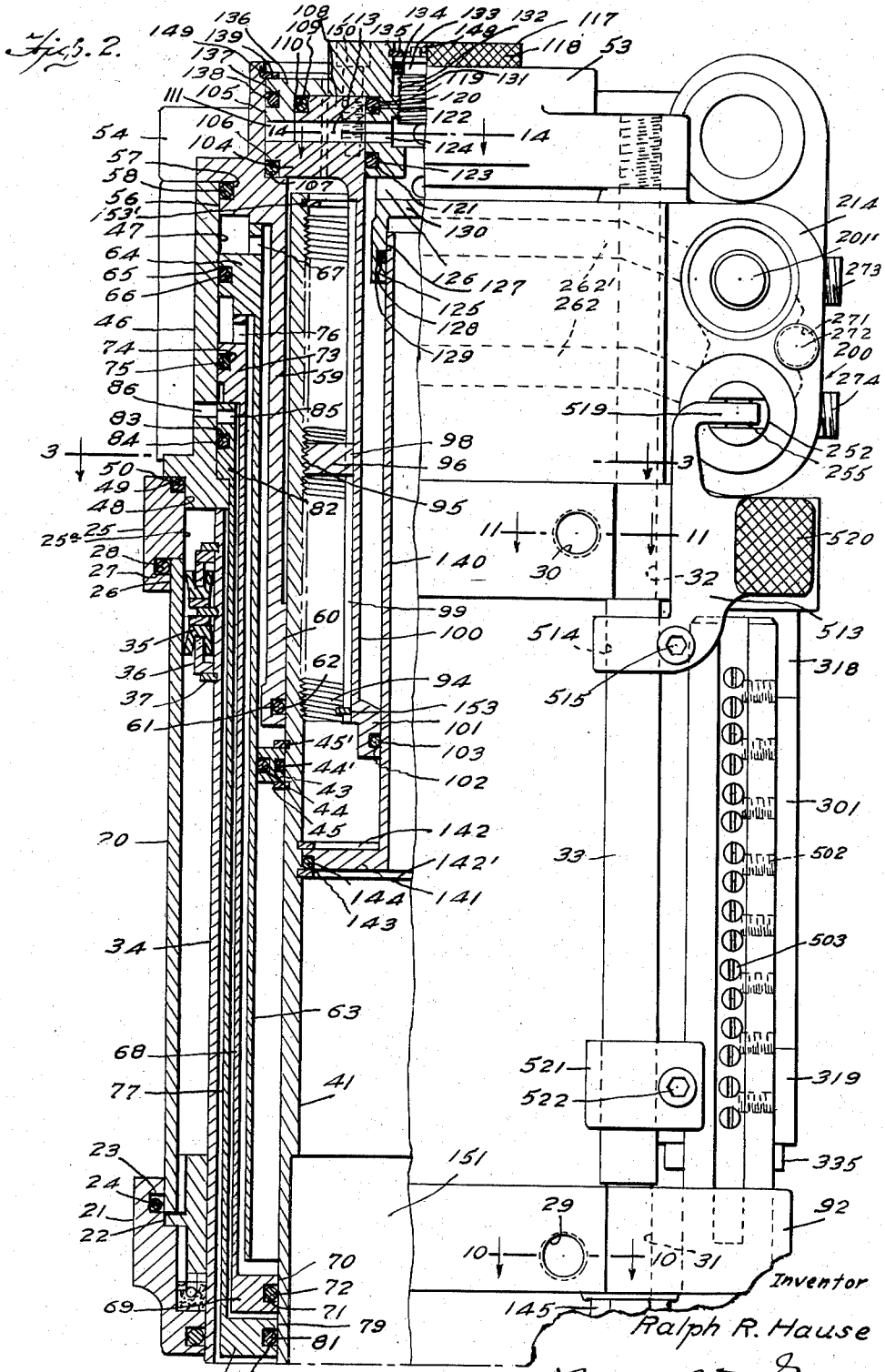

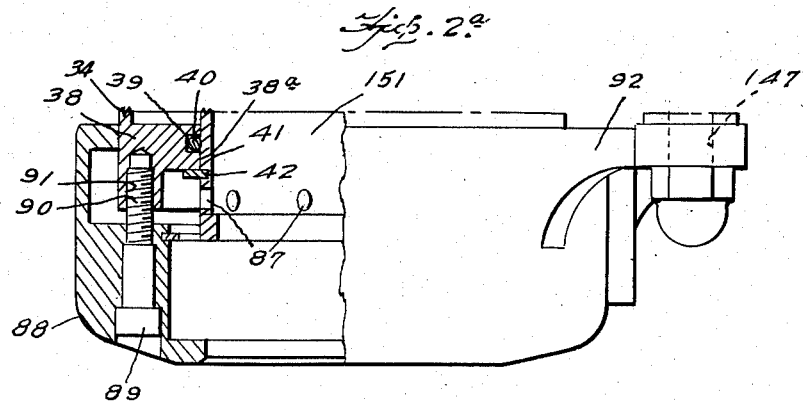
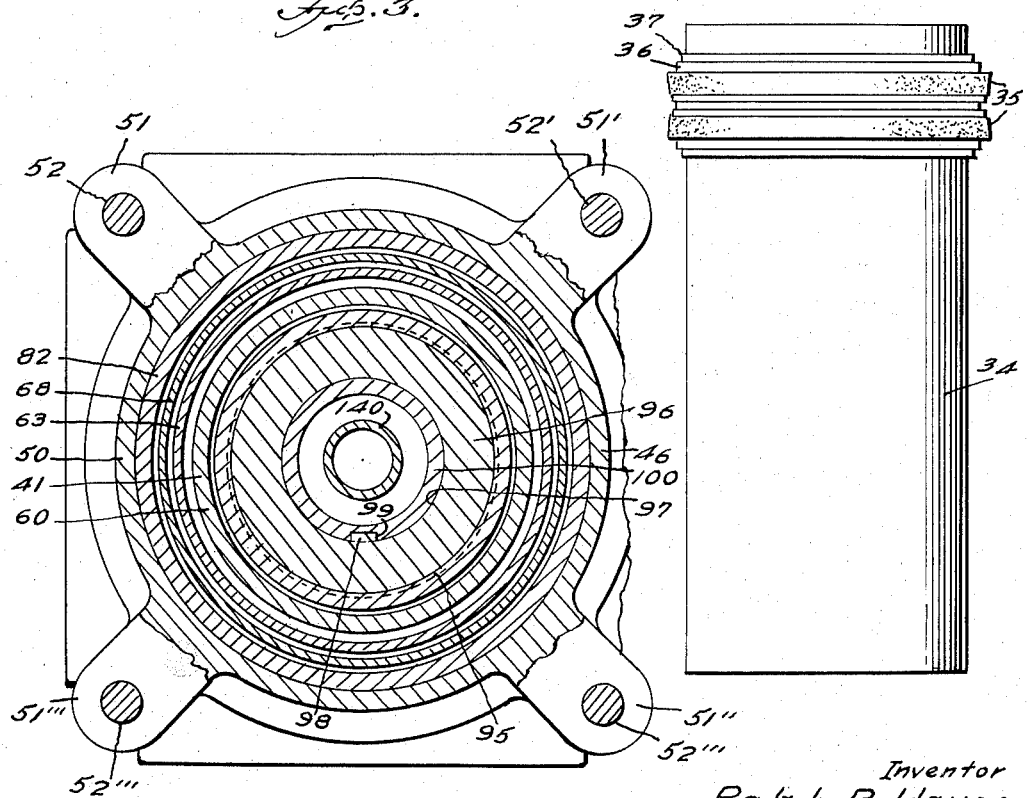

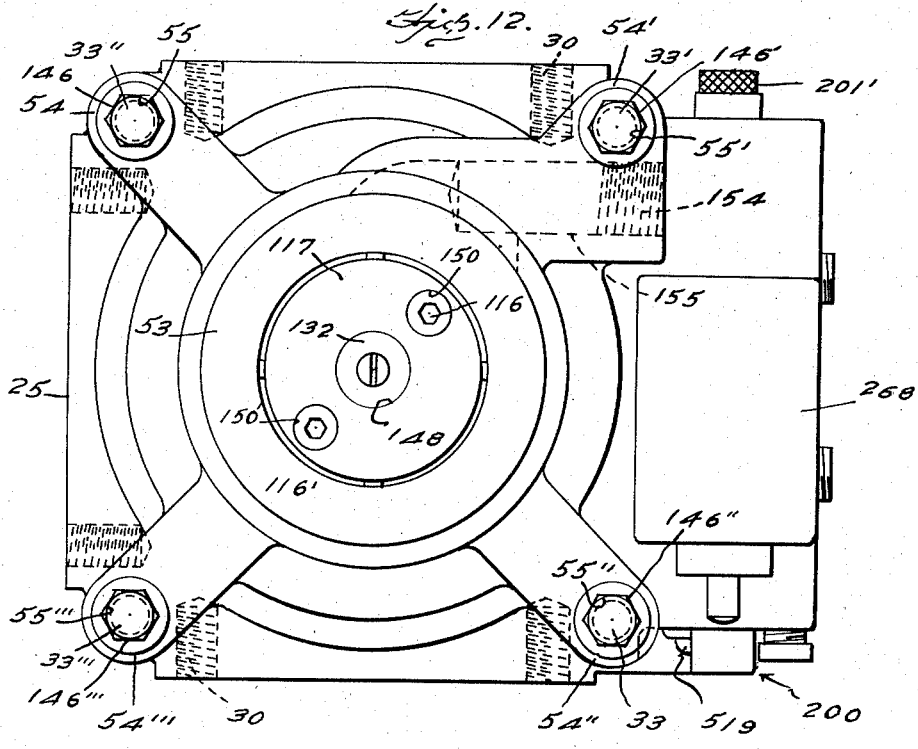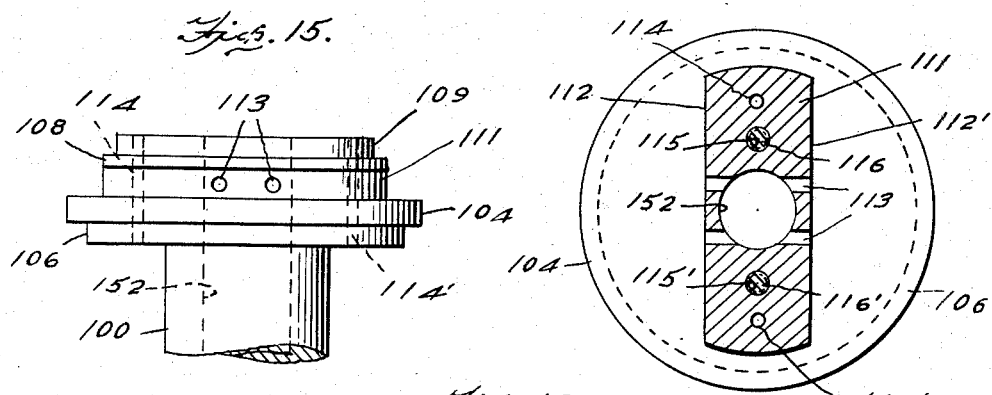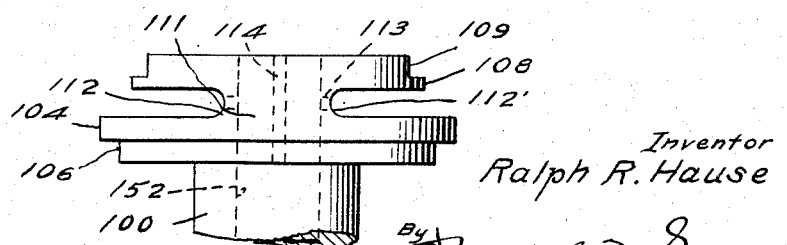

July 28, 1959  R. R. HAUSE  2,896,587
HYDRO-PNEUMATIC ACTUATOR FOR A MOTOR-DRIVEN SPINDLE
Filed Nov. 12, 1953  8 Sheets-Sheet 6
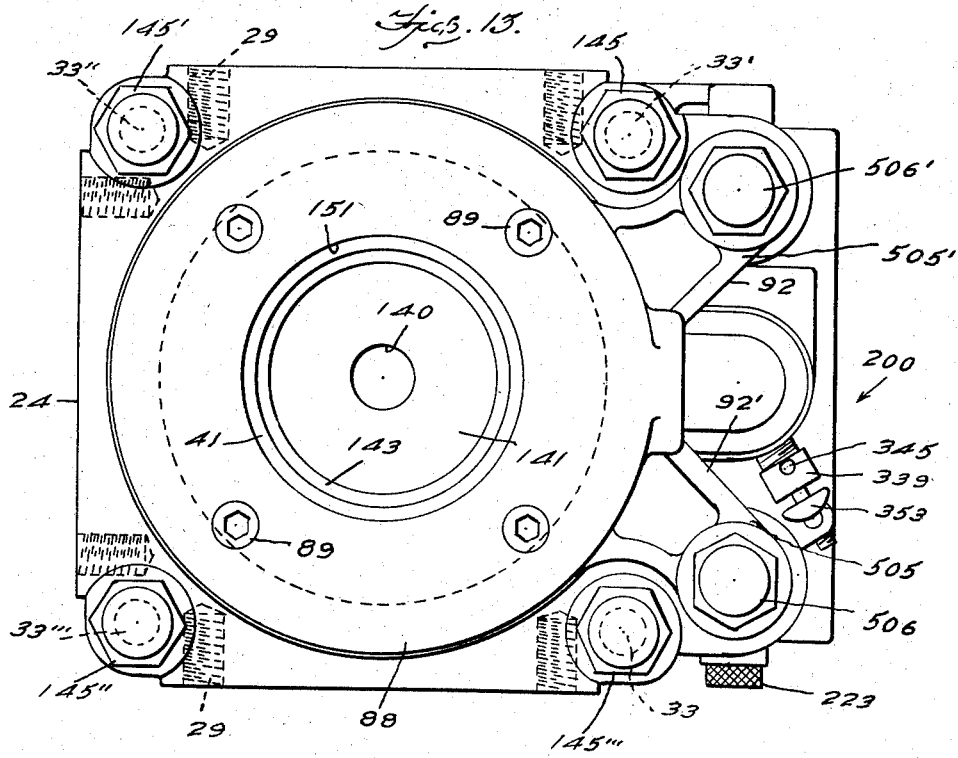
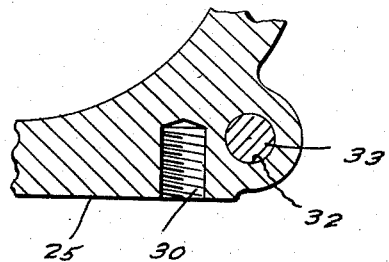
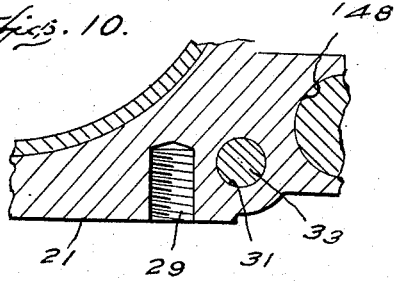
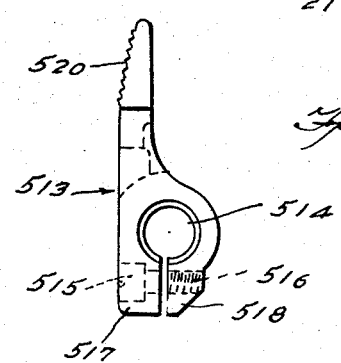
Inventor
Ralph R. Hause
By Bernard F. Garvey
ATTY.

July 28, 1959 R. R. HAUSE 2,896,587
HYDRO-PNEUMATIC ACTUATOR FOR A MOTOR-DRIVEN SPINDLE
Filed Nov. 12, 1953 8 Sheets-Sheet 8

INVENTOR.
RALPH R. HAUSE
BY
Bernard B. Harvey
ATTORNEY

United States Patent Office 2,896,587
Patented July 28, 1959

2,896,587
HYDRO-PNEUMATIC ACTUATOR FOR A MOTOR-DRIVEN SPINDLE

Ralph R. Hause, Montpelier, Ohio

Application November 12, 1953, Serial No. 391,525

10 Claims. (Cl. 121—45)

The present invention relates to a new and improved hydro-pneumatic actuator. More particularly, the present invention relates to a new and improved hydro-pneumatic actuator for a motor driven spindle for use, for example, with a tap cutter wherein the spindle is advanced and retracted by the pneumatic actuator, and wherein the rate of advance and retraction is determined by the hydraulic actuator, the pneumatic and hydraulic actuators being concentrically arranged within a single housing.

It is accordingly an object of the present invention to provide a novel and improved hydro-pneumatic actuator for a motor driven spindle.

It is a further object of the present invention to provide a novel and improved hydro-pneumatic actuator for a motor driven spindle which may be operated fully automatically or semi-automatically.

It is still a further object of the present invention to provide a compact hydro-pneumatic actuator which is simple in structure, light in weight, which may be easily manufactured, and which may be readily assembled and disassembled.

It is still a further object of the present invention to provide a hydro-pneumatic actuator for a motor driven spindle which offers great versatility in its application and operation.

Another object of the present invention resides in the provision with a hydro-pneumatic actuator for use with a motor driven spindle of a choice of an infinite number of feeding rates between zero to a predetermined maximum rate as determined by appropriate control members which are readily adjustable.

It is a further object of the present invention to provide a hydro-pneumatic actuator for a motor driven spindle which offers a choice of an infinite number of advance feeding rates and an infinite number of retracting feeding rates and wherein the advance feeding rates are independently adjustable from the retracting feeding rates, and vice-versa.

It is a still further object of the present invention to provide a novel and improved hydro-pneumatic actuator which permits easy automatic acceleration and deceleration adjustments of feeding rates during a given cycle.

Another object of the present invention is the provision of a manual control for an arbitrary, momentary acceleration of the feeding rates at any given time of the cycle of operation.

It is another object of the present invention to provide a hydro-pneumatic actuator which may be readily converted from semi-automatic to fully automatic operation and vice-versa.

It is a still further object of the present invention to provide a hydro-pneumatic actuator which may be used for drilling or tapping through the workpiece, or only drilling or tapping accurately to a predetermined depth.

Other objects and advantages in accordance with the present invention will become obvious from the following description when taken in connection with the accompanying drawing which shows for purposes of illustration only one preferred embodiment of the present invention and wherein:

Figure 1 is a top view of the hydro-pneumatic actuator with the part housing the hydraulic valve assembly in cross-section.

Figure 1a is the cover plate attached to the lower half of the assembly shown in Figure 1.

Figure 2 is a side view partially in cross-section of the hydro-pneumatic actuator in accordance with the present invention as viewed from the left of Figure 1.

Figure 2a is a side view of the cover assembly of Figure 1a partially in cross-section.

Figure 3 is a cross-sectional view along line 3—3 of Figure 2.

Figure 4 is an enlarged top view of the pneumatic valve system partially in cross-section.

Figure 5 is a cross-sectional view along line 5—5 of Figure 4.

Figure 6 is a front view of a modified form of a pressure sensitive type poppet valve assembly in accordance with the present invention.

Figure 7 is a cross-sectional view along lines 7—7 of Figure 6.

Figure 8 is a plan view of the piston assembly of the pneumatic system in accordance with the present invention.

Figure 9 is a plan view of the piston member of the pneumatic valve system.

Figure 10 is a partial cross-sectional view through the forward supporting bracket along lines 10—10 of Figure 2.

Figure 11 is a partial cross-sectional view through the rearward supporting bracket along lines 11—11 of Figure 2.

Figure 12 is a rear view of the hydro-pneumatic actuator as seen from the left of Figure 2.

Figure 13 is a front view of the hydro-pneumatic actuator.

Figure 14 is a partial cross-sectional view along lines 14—14 of Figure 2.

Figure 15 is a side view of the tubular sleeve member as viewed from the left of Figure 14.

Figure 16 is a top view of the tubular sleeve member shown in Figure 14.

Figure 17 is a plan view of the finger member.

Figure 18:
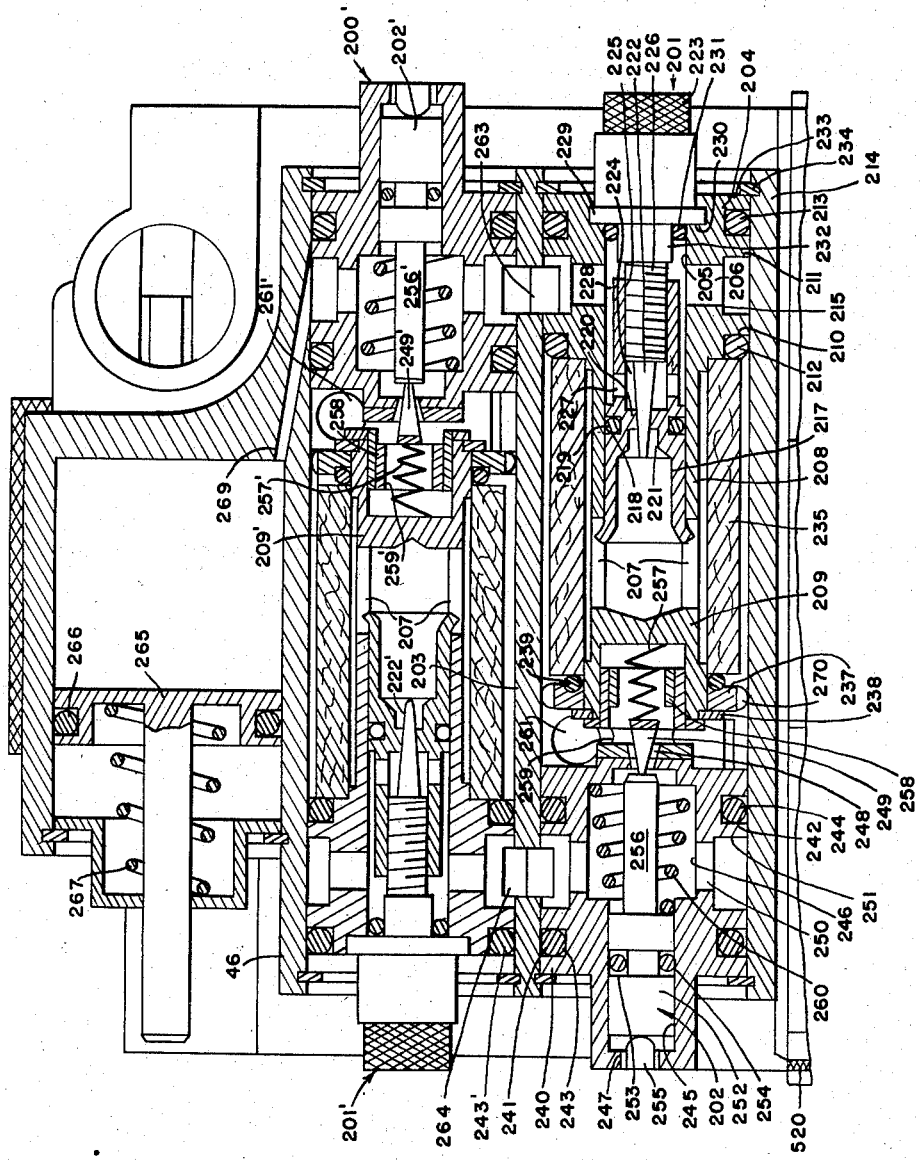
Figure 18 is an enlarged top view of the speed control valve means forming a part of the present invention.
Figure 19:
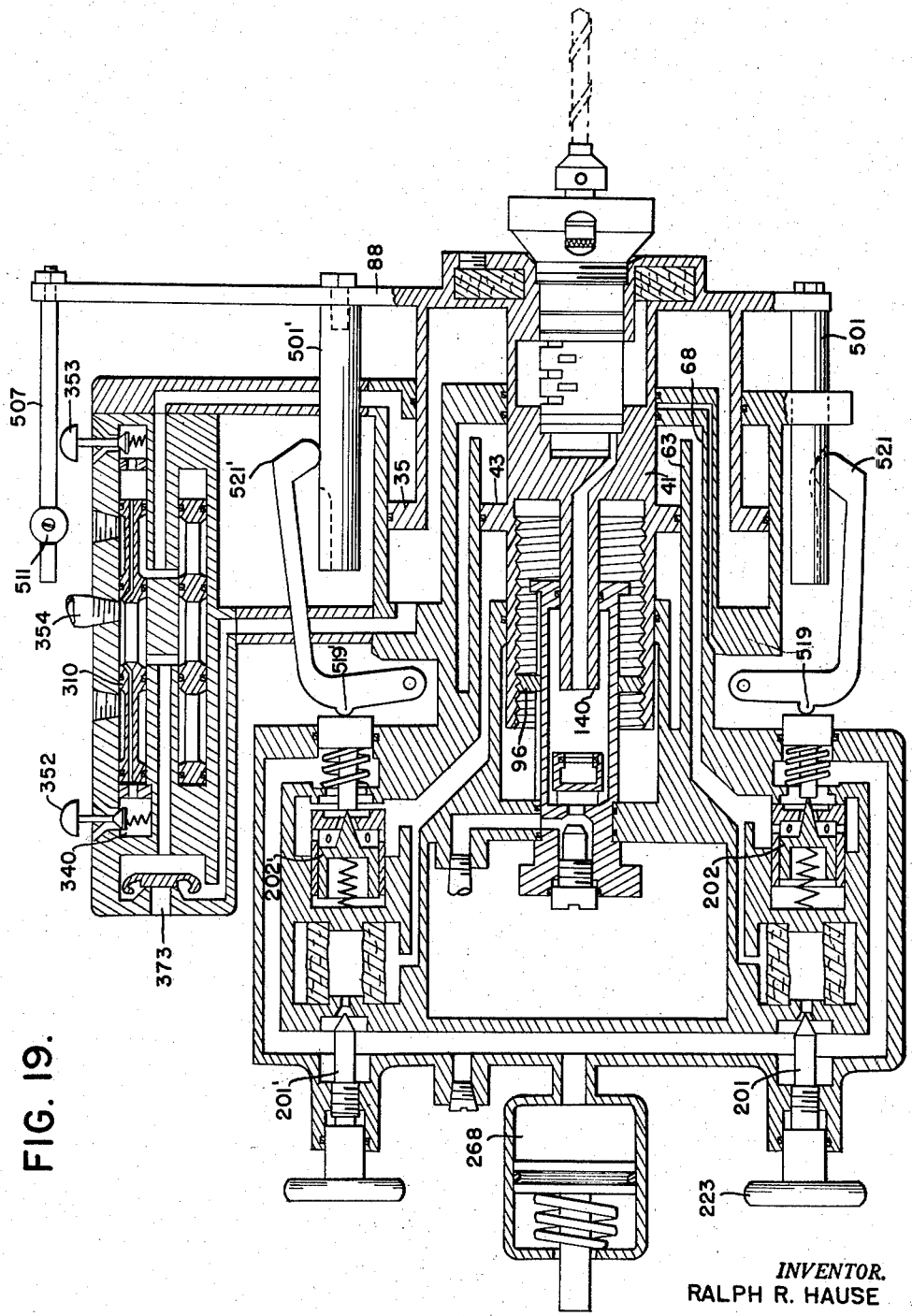
Figure 19 is a diagrammatic lay-out view of the hydro-pneumatic system of the present invention.

Referring now more particularly to the drawing wherein like reference numerals are used throughout the various views to designate like parts, reference numeral 20 (Figure 2) designates the outer circular casing which is fixed in space as will be more fully described hereinafter. Forwardly of outer casing 20, i.e., towards the bottom as viewed in Figure 2 is a forward supporting bracket 21 having an under-cut portion 22 of such inside diametric dimension as to fit over the outside diameter of outer casing 20. Under-cut portion 22 is provided with a circular groove 23 for packing 24 so as to establish a seal between outer casing 20 and forward supporting bracket 21. Rearwardly of outer casing 20, i.e., towards the top as viewed in Figure 2 is a rearward supporting bracket 25 which comprises an under-cut portion 26 of inside diametric dimension similar to under-cut portion 22 whereby the rearward supporting bracket fits over the rearward end of outer casing 20. A circular groove 27 is provided in under-cut portion 26 to receive packing 28 whereby a seal is established between outer casing 20 and rearward supporting bracket 25. The packings may be of any suitable, known material, such as, for example, neoprene and the like. Forward supporting bracket 21 and rearward supporting bracket 25 are each provided with threaded bores 29 and 30, respectively, and further each includes four bores 31, 31', 31", and 31''' and bores 32, 32', 32", and 32''', respectively, for passage therethrough of rods 33, 33', 33", and 33''' (Figures 2, 10, and 11) as will be more fully described hereinafter in connection with the assembly of the apparatus in accordance with the present invention.

Within outer casing 20 and concentric therewith is a tubular member 34 which constitutes the piston for the pneumatic system. Piston 34 is provided toward its rear end with packings 35 which are held in place by means of spacers 36 and split or snap-on rings 37 and which constitute the piston ring assembly for the pneumatic system. A flange 38 (Figure 2a) extending inwardly at right angles to tubular member 34 is provided at the forward end thereof and comprises a circular groove 39 for receiving packing 40 so as to provide an effective seal with tubular member 41 which constitutes the piston for the hydraulic system. In order to prevent relative motion in one direction between tubular members 34 and 41, a split ring or snap-on ring 42 is provided in an appropriate groove in tubular member 41 (Figure 2a). Flange-like member 38 is provided with a bore 38a which corresponds substantially to the outer diametric dimension of tubular member 41 so as to facilitate assembly thereof. Packing 40 provides an effective seal between tubular members 34 and 41.

Tubular member 41 which is also concentrically arranged with outer casing 20 constitutes the piston for the hydraulic system as already noted above. A piston ring for the hydraulic system is formed substantially at the center of tubular member 41 by means of packing retainer ring 43 which retains packings 44 and 44' and which itself is fixedly mounted on tubular member 41 by means of snap rings 45 and 45'.

Adjacent the rear supporting bracket and rearwardly thereof is the valve housing supporting bracket 46 which comprises a concentric bore 47. At the forward portion of valve housing supporting bracket 46, there is provided an under-cut portion 48 of such external diametric dimension as to interfit with the inside bore 25a of rearward supporting bracket 25. The rearward end of rearward supporting bracket 25 is provided with an under-cut portion 49 to receive packing 50 so as to provide an effective seal between rearward supporting bracket 25 and valve housing supporting bracket 46.

Valve housing supporting bracket 46 is provided with four diagonally extending arms 51, 51', 51", and 51''' (Figure 3) which are each provided in turn with bores 52, 52', 52", and 52''' which are so positioned as to be in alignment with the four bores 32 in the rearward supporting bracket 25.

Rearward of valve housing supporting bracket 46 is end member 53 which also includes four diagonally extending arms 54, 54', 54", and 54''' (Figure 12) which in turn comprises bores 55, 55', 55", and 54''' in alignment with bores 52, 52', 52", and 52'''. End member 53 is provided with an under-cut portion 56 of substantially the same outside diametric dimension as the diametric dimension of bore 47 in valve housing supporting bracket 46 whereby the under-cut portion may be inserted within the last-mentioned bore. A circular groove 57 is provided in the under-cut portion 56 to receive packing 58 so as to form an effective seal between end member 53 and valve housing supporting bracket 46.

End member 53 also comprises a forwardly extending sleeve member 59 having an inner diametric dimension slightly larger than the outer diametric dimension of tubular member 41. Forwardly extending sleeve portion 59 also comprises at its forward end a portion 60 of reduced internal diametric dimension substantially the same as the outer diametric dimension of tubular member 41. Portion 60 also includes a circular groove 61 for packing 62 whereby an effective seal is formed between tubular member 41 and sleeve member 59 including portion 60.

Concentric with tubular member 41 and of larger diametric dimension than sleeve member 59 is a first cylindrical tubular member 63 of such dimension as to effectively cooperate with packing 44 of the hydraulic piston ring assembly and constituting the cylinder wall for the hydraulic system. Tubular member 63 is provided toward its rear end with an enlarged portion 64 having an outer diametric dimension substantially the same as that of bore 47. Enlarged portion 64 is provided with a circular groove 65 for packing 66 so as to form a seal between hydraulic cylinder member 63 and the valve housing supporting bracket 46. Rearwardly of enlarged portion 64, cylinder member 63 is provided with a plurality of radially spaced holes 67 so as to permit the flow of oil into the rearward compartment of the oil cylinder formed between tubular member 41, tubular member 63, and above the piston ring assembly formed by elements 43, 44, 44', 45, and 45'.

Concentric with the first cylindrical member 63 is a second cylindrical, tubular member 68 of slightly larger diametric dimension than the first-mentioned cylindrical member 63. At the forward end of cylindrical member 68 is an inwardly extending flange 69 having a bore 70 of substantially the same diametric dimension as the outside diameter of tubular member 41. Flange 69 is provided with a circular groove 71 to receive packing 72 which provides an effective seal between tubular member 41 and flange 69 thus forming the forward end of the forward compartment of the oil cylinder.

Tubular member 68 comprises toward its rear end an enlarged portion 73 having an outer diametric dimension substantially identical with that of enlarged portion 64, i.e., also with that of bore 47. Enlarged portion 73 is provided with a circular groove 74 for packing 75 so as to form an effective seal between tubular member 68 and valve housing supporting bracket 46. Rearwardly of enlarged portion 73, tubular member 68 is provided with a plurality of radially spaced holes 76 so as to permit the flow of oil into the forward compartment of the oil cylinder through the passage formed between tubular cylindrical members 63 and 68 whereby the forward compartment is formed below (as viewed in Figure 2) the piston ring assembly formed by elements 43, 44, 44', 45, and 45' and lies intermediate tubular elements 41 and 43 with flange 69 and packing 72 forming the forward end thereof.

Concentric with tubular member 41 and of diametric dimension slightly larger than tubular member 68 is a third cylindrical tubular member 77 which is similar in configuration to cylindrical member 68. Cylindrical member 77 comprises at its forward end an inwardly extending flange 78 having a bore 79 of a diametric dimension substantially similar to the external diametric dimension of tubular member 41. Flange 78 comprises a circular groove 80 for packing 81 so as to form an effective seal between tubular member 41 and tubular member 77. Tubular member 77 is provided toward the rear end with an enlarged portion 82 having an outer diametric dimension substantially similar to that of enlarged portions 64 and 73. Enlarged portion 82 comprises a circular groove 83 for packing 84 so as to form an effective seal between tubular member 77 and valve housing supporting bracket 46. Rearward of enlarged portion 82 tubular member 77 is provided with a plurality of radially spaced holes 85 which communicate with one or more radially spaced holes 86 in valve housing supporting bracket 46 so as to permit escape of the air which may find itself between tubular members 68 and 77, thereby preventing compression of air which may be trapped therebetween.

Forward end member 88 (Figure 2a) which simultaneously serves as muffler for the air motor is affixed to flange portion 38 of the pneumatic piston 34 by means of four machine screws 89 (Figures 2a and 13) whose threaded portions 90 engage the threaded bores 91 in flange 38. The forward end 88 is also provided with two diagonally extending arms 92 and 92' (Figure 13) having bores 147 and 147' in alignment with bores 148 (Figure 10) in forward supporting bracket 21.

Tubular member 41 is provided at its forward end with a cavity 151 (Figures 2 and 2a) for the spindle rotating air motor, and includes in its rear portion an internally threaded portion 94 (Figure 2). The externally threaded portion 95 of ring 96 (Figures 2 and 3) engages the internally threaded portion 94. Ring 96 is provided with a bore 97 and a key 98 extending inwardly into the bore (Figure 3). Key 98 engages keyway 99 provided in tubular sleeve member 100. Tubular sleeve member 100 is provided at its forward end with an inwardly extending flange member 101 which comprises a circular groove 102 for packing 103 thereby forming an effective seal with sleeve member 140 to be described more fully hereinafter. Tubular sleeve member 100 is provided at its rear end with an enlarged section 104 (Figures 2, 14, 15, and 16) of such outer diametric dimension as to correspond to bore 105 in end member 53. Enlarged section 104 is provided at its forward end with an under-cut portion 106 (Figures 2, 14, 15, and 16) for packing 107 so as to form an effective seal between end member 53 and tubular sleeve member 100. Rearwardly of enlarged section 104 is a section 108 of reduced diametric dimension, which comprises an undercut portion 109 to receive packing 110 so as to form an effective seal with ring member 136 to be more fully described hereinafter. Between enlarged section 104 and reduced section 108 lies an intermediate section 111 which has segments thereof removed on diagonally opposite sides as indicated by lines 112 and 112' (Figures 14 and 16). Intermediate section 111 is provided with bores or holes 113 which communicate with the inner bore 152 in tubular member 100. Longitudinal vent holes 114 and 114' (Figure 15) are provided which extend longitudinally through enlarged section 104 and reduced section 108 and serve to permit escape of air trapped between sleeve member 100, enlarged section 104, ring 96, tubular member 41, and sleeve member 59. Furthermore, threaded portions 115 and 115' are provided for machine screws 116 and 116' which secure knob member 117 to the member comprising sleeve 100, enlarged section 104 and reduced section 108. Knob member 117 is provided with a knurled surface 118 on the outside thereof, and includes an under-cut portion 119 of substantially the same outer diametric dimension as the inner diametric dimension of tubular member 100 whereby the under-cut portion 119 slides into the bore 152 in sleeve member 100 and the corresponding bores through sections 104, 108, and 111 thereof. Undercut portion 119 is provided with circular grooves 120 and 121 to receive packings 122 and 123, respectively, so as to form an effective seal between the inner surface of tubular member 100 formed by bore 152 and the under-cut portion 119 of knob member 117. Intermediate circular grooves 120 and 121, a plurality of radially spaced holes 124 are provided which are in alignment with bores 113 with knob member 117 assembled to sleeve member 100 by means of machine screws 116 and 116' which rest in countersunk portions 150 and 150' of knob member 117 and engage threaded portions 115 and 115'.

Knob member 117 is further provided with a forwardly extending sleeve portion 125 which includes a plurality of radially spaced holes 126 to permit passage of compressed air which enters through holes 124 into the space formed within sleeve member 100. The forward portion of sleeve member 125 is of such inside diametric dimension 127 as to fit over tubular member 140, and comprises a circular groove 128 for packing 129 so as to form an effective seal between tubular member 140 and sleeve member 125 to thereby cut off compressed air from the air motor with the assembly in the retracted position. Sleeve member 125 also comprises a cross wall 130. In its rear portion, knob member 117 comprises a threaded portion 131 for engagement with threaded plug member 132 which may be used to cut off the input of compressed air and which comprises a circular groove 133 for packing 134 so as to form an effective seal between plug member 132 and knob member 117. A split or snap ring 135 may be inserted into an appropriate groove in the counter-sunk portion 149 of knob member 117, so as to form a positive stop for plug member 132. A ring member 136 having a circular groove 137 to receive packing 138 is used to fasten the sleeve member 100 within end member 53 by means of a snap-on or spring ring 139. Within tubular member 41 and concentric therewith is a further sleeve member 140 of similar outside diametric dimension as the inside diametric dimension 127 of inwardly extending flange 101 provided on the forward portion of tubular member 100. Sleeve member 140 is provided at its forward end with a flange portion 141 substantially at right angles to sleeve member 140 which is fastened to tubular member 41 by means of split rings 142 and 142' which are secured to tubular member 41 in appropriate grooves thereof. Flange portion 141 is provided with an under-cut portion 143 to accommodate packing 144 so as to form an effective seal between tubular member 141 and tubular member 140.

The outer casing 20, forwardly supporting bracket 21, rearwardly supporting bracket 25, valve housing supporting bracket 46, and rear end member 53 are assembled by means of rods 33, 33', 33", and 33'" which pass through bores 31, 31', 31", and 31'", bores 32, 32', 32", and 32'", and bores 52, 52', 52", and 52'" and which are provided at both ends with threaded portion for engagement with threaded bores 55, 55', 55", and 55'" in arms 54, 54', 54", and 54'" and with nuts 145, 145', 145", and 145'" and 146, 146', 146", and 146'" which hold these elements in their assembled position. Stop rings 153 and 153' define the maximum advanced and retracted positions of ring 96.

Referring now to the hydraulic valve system, to which is assigned the two hundred series of reference numerals, reference numeral 200 designates the hydraulic valve assembly (Figures 1 and 2). The valve system comprises two identical valve assemblies which are different only in that their positions are reversed by 180° as is more fully shown in Figure 1 of the drawing. Accordingly, only one assembly will be more fully described while corresponding parts of the other system are designated by primed reference numerals.

Each valve assembly comprises a manual subassembly 201 and an automatic subassembly 202. The two valve assemblies which are positioned in the top of the valve housing supporting bracket 46 are separated by a transverse wall 203.

Each valve assembly comprises a valve bearing member 204 having a longitudinal bore 205 and a plurality of radially spaced holes 206 and diagonally opposite slots 207 with the latter in the reduced diametric section of the valve bearing member 204. A transverse wall 209 is also provided in the reduced diametric section 208 of the valve bearing member 204. The manual subassembly 201 (201') is to the right of transverse wall 209 (and to the left wall 209'), while the automatic subassembly 202 (202') is to the left of wall 209 (and to the right of 209'). The valve bearing member comprises two under-cut portions 210 and 211, respectively, to receive packings 212 and 213, respectively, which form an effective seal between valve bearing 204 and the valve housing 214 located on top of valve housing supporting bracket 46. Intermediate undercut portions 210 and 211 is an intermediate section 215 of reduced diametric dimension into which abut radially spaced holes 206 which establish a communication between the space formed between packings 211 and 213 and the longitudinal bore 205. A needle valve bearing member 217 is provided within longitudinal bore 205 which comprises a circular groove 218 for packings 219 which effectively form a seal between needle valve bearing member 217 and valve bearing member 204. Needle valve bearing member 217 is provided with a transverse wall 220 which includes a bore 221 to accommodate the needle valve 222 at the left end (as viewed in Figure 1) of the manual adjusting member 223. Needle valve bearing member 217 comprises a further bore 224 of larger diametric dimension than bore 221 which has a threaded portion 225 for engagement with the threaded portion 226 of manual adjusting member 223. The needle bearing member 217 is also provided with a transverse bore 227 which establishes a communication between the outside of the reduced diametric portion 228 of needle valve bearing member and the further bore 224 thereof. Manually adjusting member 223 is provided with a flange 229 which rests against under-cut portion 230 in the right-hand portion of valve bearing member 204. A sealing ring 231 is provided around portion 232 of the manual adjusting member 223 so as to form an effective seal between portion 232 and valve bearing member 204.

From the foregoing description, it is quite obvious that the needle valve 222 will more or less open the passage through bore 221 as the member 223 is rotated. In order to position the manual adjusting member 223 with respect to the valve housing 214, a ring 233 and a snap-on ring or split ring 234 is used which is positioned in an appropriate groove in valve housing 214. A filter unit 235 may be provided which fits over valve bearing member 204. Filter 235 is retained in position by retainer ring 237 which itself is affixed to valve bearing member 204 by means of snap-on or split ring 238. A packing 239 is also retained in position by means of retainer ring 237. The automatic valve assembly comprises a valve bearing member 240 which is provided with circular grooves 241 and 242 to receive packings 243 and 244 so as to provide an effective seal between valve bearing member 240, valve housing 214 and transverse wall 203. Valve bearing member 240 is provided with a first bore 245 which is in communication with a second bore 246 of larger diametric dimension than said first-named bore. The first bore is in communication with the outside of valve bearing member 240 by a bore 247 of reduced diameter while the second-named bore 246 is in communication with the outside of valve bearing member 240 by means of bore or port 248.

The bore 246 is also in communication with the outside of valve bearing member 240 by means of a plurality of radially spaced holes 250 which establish a communication between bore or cavity 246 and the portion 251 of reduced outer diametric dimension intermediate packings 243 and 244. A piston member 252 is slidably positioned within bore 245 and comprises a circular groove 253 for packing 254. The left-hand portion of piston member 252 is provided with an indentation 255 for cooperating with a finger to be more fully described hereinafter. The right-hand portion of piston member 252 is provided with a cylindrical shaft member 256 which is in contact at its extreme right-hand end with the needle portion of needle valve member 249.

The needle valve member 249 which includes a partial internal bore is spring loaded by means of a helical spring 257 which rests on the right hand against transverse wall 209 and on the left hand against the wall formed forwardly in the internal bore thereof, whereby valve member 249 is urged toward the left into a position tending to close the needle valve. Valve member 249 is provided with openings which communicate with the internal bore thereof at the forward or left end thereof.

Needle valve member 249 is slidably housed in the internal bore of needle valve bearing member 258 which functions as a check valve, as will be described more fully hereinafter. Valve bearing member 258 is provided with a small axial opening or bore 259 which receives the needle of needle valve member 249. Needle valve bearing member 258 is further provided with a plurality of peripherally extending apertures or slots near the left end portion thereof which communicate with the internal bore. The left end portion formed by an end wall which includes the bore 259 and which is in axial alignment with port 248, abuts against the external surface formed by the flange of valve bearing member 240 which projects toward the right.

With the hydraulic fluid under pressure flowing out of port or opening 261 through openings 259, the left end wall portion of bearing member 258 is forced against the last-mentioned flange of valve bearing member 248 whereby the fluid may only pass through the opening 259 of valve bearing member 258 which is determined by the setting of the needle valve member 249.

However, with the hydraulic fluid flowing in the opposite direction through passage 264, bore 250 and bore 248, the valve bearing member 258, together with needle valve member 249, is moved toward the right against the spring pressure of spring 257 so that the hydraulic fluid may flow freely through port 248 in the opposite direction. Thus the valve bearing member 258 at the same time fulfills the functions of a one-way check valve. A tapered helical spring 260 is provided within cavity 246 and rests with its larger end against valve bearing member 240 and with its small end against piston member 252 thereby normally urging piston member 252 in the same direction as needle valve member 249 is urged by helical spring 257, which is the direction of closure of the automatic needle valve. A bore 261 which connects the space outside valve bearing member 204 and valve bearing member 240 with the communicating passage 262, shown in dotted lines in Figure 2, thereby permits the flow of the fluid to the forward compartment of the hydraulic cylinder through radially spaced holes 76, etc. (and through bore 261', passage 262', and radially spaced holes 67 for the other valve assembly).

From the foregoing, it is quite obvious a movement of piston member 252 against the pressure exerted by spring 260 will open the needle valve member 249. Communicating passages 263 and 264 are provided in transverse wall 203 to permit flow of the fluid from one valve assembly to the other.

A piston assembly 265 with appropriate packings 266 is also provided so as to compensate for expansion of the fluid due to changes in temperatures or due to occasional losses of the fluid in the system. Piston assembly 265 is spring loaded by means of helical spring 267 thereby urging piston assembly 265 toward the right so as to supply to the hydraulic system if necessary additional fluid from reservoir 268 through communicating passage 269. Ring 237 is provided with peripherally located holes or indentations 270 to permit passage of the fluid entering the valve system through bore 261 into the manual valve subassembly 201, and more particularly into the space formed between filter 235 and the valve housing 214 and transverse wall 203, and vice versa.

Referring now to Figure 4 which shows the pneumatic control system to which is applied the three hundred series, reference numeral 300 designates the housing for the pneumatic control system. The pneumatic control system comprises a pneumatic valve housing 301 which is tubular and comprises a central bore 302 (Figures 4 and 5) which constitutes the cylinder for the pneumatic valve. The valve is formed by a central member 303 which extends beyond the ends of the valve housing 301 on both sides thereof. The central member 303 is provided with two sets of holes at 304 and 305 which are radially spaced as indicated at 306 and 307 and communicate with the two centrally located bores 308 and 309 provided within central member 303. A piston member 310 is located within housing 301 intermediate central member 303 and housing 301. The piston member 310 is provided with a central bore 311 and radial bores 312, 312', 312'', and 312''', which provide communicating passages between the outside and the interior of piston member 310. The piston member 310 comprises enlarged portions 313, 313', 313'', and 313''', which form the piston rings thereof, and which are each provided with a central groove 314, 314', 314'', and 314''', to receive packings 315, 315', 315'', and 315''', respectively, to form effective seals between the valve housing 301 and the piston member 310. On the inside of the piston member 310 there are provided appropriate grooves into which are placed snap rings 315a which together with spacers 316 and packings 317 form an effective seal between the inside of piston member 310 and the outside of central member 303.

Two similar poppet valve housings 318 and 319 are provided adjacent both sides of valve housing 301. The poppet valve housing 318 and 319 each include a central bore 320 and 321 of diametric dimensions slightly larger than the external diametric dimension of central member 303, whereby a space or communicating passage for air, etc. is formed therebetween. Poppet valve housings 318 and 319 are also provided with under-cut portions 322 and 323 on their respective sides facing the valve housing 301, and are further so dimensioned as to slide into bore 302 within which they may thus rotate. The under-cut portions 322 and 323 are each provided with a circular groove 324 and 325 to receive packings 326 and 327, whereby an effective seal is formed between poppet valve housing 318 and 319 and central housing 301.

On their respective sides, away from valve housing 301, poppet valve housing 318 and 319 are each provided with a bore of reduced diametric dimension 328 and 329 which are about of the same dimension as the outside diameter of the central member 303. Packings 330 and 331 located in central grooves 332 and 333 of central member 303 produce an effective seal between poppet valve housings 318 and 319, and central member 303.

Central member 303 is provided at its right end portion with an externally threaded portion 334 which engages the internal threaded portion of nut 335 for purposes of retaining the pneumatic control system in assembled condition. At its left end, central member 303 is provided with an enlarged section 359 which abuts against under-cut portion 360 in poppet valve housing 318 whereby nut 335 retains the pneumatic valve control system in assembled condition.

Each poppet valve housing 318 and 319 is provided with a tapered threaded bore 336 and 337 for engagement with the externally threaded portions of poppet valve bearing members 338 and 339.

Poppet valve bearing members 338 and 339 are each provided with a bore 340 and 341 followed by counter-sunk portions 342 and 343 of larger diametric dimensions than bores 340 and 341. Cross-bores 344 and 345 provide communicating passages with the atmosphere for the compressed air, etc., within poppet valve housings 318 and 319 through bores 340, 341 and 342, 343 when the poppet valves are opened by manual or automatic actuation. The poppet valves 346 and 347 are spring loaded by means of helical springs 348 and 349, and are each provided with a valve-closure end member 350 and 351 and an actuating member 352 and 353.

Valve housing 301 is provided with a threaded inlet port 354 (Figure 5) which is in communication with the space formed between poppet valve housings 318 and 319 and central member 303 through communicating passages 355 and 356 shown in dotted lines in Figure 5, and with the space intermediate piston ring assemblies 313', 314', 315' and 313'', 314'', 315'' by means of channel 361. The valve housing 301 further comprises threaded exhaust ports 357 and 358 which communicate with the space intermediate piston ring assemblies 313, 314, 315 and 313', 314', 315' through channel 362, and with the space intermediate piston ring assemblies 313'', 314'', 315'' and 313''', 315''' through channel 363.

The lower end of central member 303 (as viewed in Figure 4) is supported by extension 364 (Figures 1 and 4) of forward supporting bracket 21 which is provided with an appropriate bore 365 (Figure 4) to receive central member 303 and bearing supporting member 366, the latter being retained in position by means of an appropriate set screw (not shown) engaging the grooved portion 368 of bearing supporting member 366 through threaded bore 367. Appropriate packings (not shown) may be provided to produce the necessary seals. Furthermore, a connecting bore (not shown) is provided in extension 364, which connects the space formed by bore 365 with the forward compartment of the pneumatic cylinder formed between outer casing 20 and tubular member 34 and to the right of piston ring assembly 35, 36, and 37 so that compressed air may reach the forward compartment through bore 309.

The upper end of the pneumatic control system (as viewed in Figure 4) is supported in extension 369 of rearward supporting bracket 25 which is provided with an appropriate bore 370 to receive under-cut portion 371 of the poppet valve housing 318. Packing 372 in an appropriate groove in under-cut portion 371 provides an effective seal between poppet valve housing 318 and extension 369.

Extension 369 is also provided with a threaded quick exhaust port 373 and diaphragm 374 (Figure 1) cooperating with quick exhaust port 373 in a manner more fully described hereinafter. Furthermore, a connecting bore (not shown) is provided in extension 369 which connects the space formed by bore 370 with the rearward compartment of the pneumatic cylinder formed between outer casing 20 and tubular member 34 and to the left of piston ring assembly 35, 36 and 37 so that compressed air may reach the rearward compartment through bore 308.

The pressure sensitive poppet valve system shown in Figures 6 and 7 is indicated by reference numeral 400 and comprises an elongated tubular member 401, having a central bore 402, and an externally threaded portion 403 to which is attached a compression nut 404 by means of its internally threaded portion 405. Compression nut 404 is provided with a set screw 406 for adjusting the dwell as will be more fully described hereinafter and includes a communicating passage 407 in alignment with the central bore 402 for insertion of a connecting tube (not shown). On the other side of tubular member 401 there is provided an actuator 408 with a central bore 409 and a counter sunk portion 410. The actuator 411 is spring loaded by means of spring 412 and is provided with a circular groove 413 and a flange 414 to receive packings 415 and 416, respectively. The spring 412 rests against the other side of the flange 414 and end member 417 which is retained within the counter-sunk portion 410 by means of a snap ring 418 provided in an appropriate groove in the counter-sunk portion 410. The pressure sensitive poppet valve system is used for drilling to accurate depths in cooperation with ring 96, stop ring 152, etc., to be more fully described hereinafter.

The five hundred series reference numerals is used to designate the automatic mechanical actuating mechanism for the automatic valve subassembly 202. Reference numerals 501 and 501' designate two rods, each of which is provided with a plurality of holes adapted to receive set screws 502 and 502' and a plurality of threaded bores adapted to receive camming elements 503 and 503' located at right angles to set screws 502 and 502' in rods 501 and 501'. These rods 501 and 501' pass through appropriate bores 504 and 504' in forward supporting bracket 21 (Figure 1) and are fastened to two arms 505 and 505' (Figure 13) which project from forward end member 88 by means of appropriate nuts 506 and 506' (Figures 1a and 13) which engage corresponding threaded portions of rods 501 and 501'.

A poppet valve actuating member 507 is mounted on rod 501' by means of appropriate bolt 508 and comprises a base plate 509 which includes a bracket 510. A cylindrical member 511 is fastened within bracket 510 by means of set screw 512. Member 511 cooperates with poppet valve actuating members 352 and 353 in a manner to be more fully described hereinafter.

A finger member 513 (Figures 2 and 17) is provided with a bore 514 of such dimension as to fit over rod 33'. Finger member 513 is fastened or clamped to rod 33' by means of a machine srcew 515 which engages the threaded portion 516 of a bore in the split end members 517 and 518 of finger member 513. Finger member 513 further comprises an extension 519 which is so shaped as to engage indentation 255 of the piston member 252. Actuating finger member 513 also comprises a knurled portion 520 for manual actuation thereof. A follower member 521 is also clamped on rod 33' by means of bolt 522 (Figure 2) and comprises a follower arm 523 which engages the cammed surface formed by camming elements 503. It is thus obvious that the follower arm 523 which rides on top of the surface formed by camming elements follows the contour thereof as the actuator moves axially together with rods 33', etc., and thereby rotates rod 33', which rotation is translated into longitudinal movement of piston member 252 by means of extension 519 of finger member 513 which engages piston member 252, and thereby more or less opens the valve 249.

Similar finger member 513' and follower arm 523' (not shown) are used in connection with rod 33 to actuate the needle valve 249' of the automatic valve assembly 202'.

The bores for camming elements 503 and 503' may also be threaded so that set screws may be used as camming elements which may be securely positioned by set screws 502 and 502'.

*Operation*

At first, the operation of the hydro-pneumatic actuator will be described when used to drill through a work piece while operating semi-automatically, i.e., while operating as a one-cycle device which is manually actuated to start operation thereof, and which will stop after completing one cycle of operation.

Let it be assumed that the movable spindle assembly consisting of tubular members 140, 41, 63, and 34, end member 88, rods 501 and 501', and the air motor (not shown) in cavity 151 together with those elements fastened thereto for movement therewith are in their normally quiescent or rest position as shown in Figure 2 of the drawing. This position corersponds to the maximum retracted position of the actuator.

At that point of the operation compressed air is cut off from the air motor by reason of the air-tight seal formed between sleeve portion 125 and tubular, further sleeve member 140 by packing 129 thereby preventing the compressed air from reaching the air motor which is normally admitted thereto through threaded inlet port 154 (see Figure 12), channel 155 in end member 53, holes 113 and 124, radially spaced holes 126, the space formed between tubular members 100 and 140 and through further sleeve member 140.

Since the spindle assembly is in its rest position during that time, no pressure exists in the hydraulic system which is in equilibrium at that time.

The pneumatic system, and more particularly, the piston assembly thereof consisting of valve member 310 and elements 313, 314, 315, 316, 317, etc., is in its lower position as viewed in Figure 4, i.e., the position opposite that shown in Figure 4, since it was left in that position after the last actuation of the poppet valve 347, as will be more fully described hereinafter.

In order to initiate operation of the actuator, the poppet valve actuating member 352 of poppet valve 346 is manually depressed. It should be noted also that during the rest period of the actuator, compressed air was able to reach the spaces formed between central member 303 and poppet valve housings 318 and 319 through channels 355 and 356 so that prior to actuation of poppet valve actuating member 352, equilibrium of air pressure existed within both poppet valve housings 318 and 319.

Upon momentary actuation of poppet valve actuating member 352 compressed air is permitted to escape from within poppet valve housing 318 through bores 340, 342, and cross-bore 344, thereby reducing the air pressure within poppet valve housing 318, and thus creating a lower pressure in poppet valve housing 318 than in poppet valve housing 319 so that the piston 310 is urged by the pressure differential toward the position shown in Figure 4 of the drawing from its previous lower position described above.

Movement of the piston assembly 310, 313, 314, 315, 316, 317, etc., to the position indicated in Figure 4, will produce the following results.

Compressed air admitted through threaded inlet port 354 is permitted to reach the space within bore 302 intermediate piston ring assemblies 313', 314', 315', and 313'', 314'', 315'' through channel 361 from where it passes through bore 312', hole 304 and radially spaced holes 306 into bore 308 of central member 303. From bore 308, compressed air will pass into bore 370 in extension 369 of rearward supporting bracket 25, where it will actuate the diaphragm 374 to close the quick exhaust port 373 by means of the central portion thereof. Compressed air will leak around the peripheral edges of diaphragm 374 to enter the connecting bore located in rearward supporting bracket 25 to the left of diaphragm 374 as shown in Figure 1 to enter the rearward compartment of the pneumatic cylinder formed within bore 25a of rearward supporting bracket 25, intermediate tubular members 20 and 34, and towards the top of pneumatic cylinder formed by elements 35, 36, and 37.

Application of compressed air to the rearward compartment of the pneumatic cylinder will tend to move the spindle assembly forwardly by reason of the pressure exerted on the top of the piston assembly 35, 36, and 37 rigidly connected to tubular member 34 which will also move end member 88 and tubular member 41 by reason of the connections existing therebetween through machine screws 89 and ring 42.

Movement of the spindle assembly is, however, resisted by the hydraulic system since movement of tubular member or hydraulic piston 41 which supports the piston ring assembly 43, 44, 45, 44' and 45' would tend to compress the hydraulic fluid present in the forward compartment of the hydraulic cylinder formed between tubular members 41 and 63 and to the right of the piston ring assembly. Because of the relative incompressibility of the hydraulic fluid, the rate of advance of the spindle assembly is, therefore, determined by the rate at which the fluid may escape from the forward compartment of the hydraulic cylinder, which in turn is determined by the setting of the valves in the manual and automatic valve subassemblies.

The hydraulic fluid will tend to escape from the forward hydraulic cylinder compartment through the space formed between tubular members 63 and 68, through radially spaced holes 76 and communicating passage 262 (Figure 2) and through bore 261 (Figure 1) into the lower valve assembly as viewed in Figure 1.

At that point, a portion of the hydraulic fluid will flow through holes 270 located in the periphery of retainer ring 237 through filter 235 and through diagonally opposite slots 207 into the space within manual needle valve bearing member 217. The hydraulic fluid will then pass through the opening formed between bore 221 and needle valve 222, the opening of which depends on the manual setting of the needle valve 222 by means of knurled adjusting member 223 which more or less opens the bore 221 by rotation thereof so that the rate of escape of the hydraulic fluid may be adjusted manually to any predetermined value up to a maximum which is determined by the size of bore 221.

The hydraulic fluid will then pass through transverse bores 227 through the space formed between reduced diametric portion 228 of manual needle valve bearing member 217 and valve bearing member 204, through radially spaced holes 206 and through communicating passage 263 in transverse wall 203.

Another portion of the hydraulic fluid will flow from bore 261 through communicating passage 259 into the interior of the automatic needle valve bearing member 258 from where it will tend to flow through the opening formed between bore 248 and automatic needle valve 249 at a rate dependent on the amount of opening provided thereat. The amount of opening, however, is in turn dependent on the displacement of piston member 252 and cylindrical shaft member 256 which is controlled by the amount of rotation of rod 33' which is translated into longitudinal movement by finger member 513, the extension 519 of which engages the indentation 255 in piston member 252. The amount of rotation of rod 33' is dependent on the position of follower arm 523 of follower member 521, clamped to rod 33', which at any given moment of the cycle of operation is dependent on the configuration or contour formed by the camming elements in holes 502 on which the follower arm 523 rides. Thus, if it is desired to speed up the rate of approach of the spindle assembly to the work piece, this may be readily done by providing a relatively high camming surface by permitting relatively large portions of the camming elements to extend beyond the surface of rod 501. The provision of set screws 502 at right angles to camming elements 503 to retain the latter in any predetermined position, allows simple and quick adjustment of the contour of the camming surface to adapt the operation of the actuator to any desired particular operation.

After passage through the opening formed between bore 248 and automatic needle valve 249, the hydraulic fluid will enter cavity 246 in automatic valve bearing member 240, from where it will flow through radially spaced holes 250 and through reduced diametric portion 251 of valve bearing member 240 into communicating passage 264.

Communicating passages 263 and 264 are directly interconnected in valve housing 214 by means of a bore which terminates in a threaded bore 271 (Figure 2) for engagement with a threaded plug member 272. This last-mentioned bore together with the threaded bore 271 also serves as inlet port for the hydraulic fluid through which the hydraulic system may be filled with a fluid, and which is closed thereafter by threaded plug member 272.

Thus the hydraulic fluid, after passage through the manual and the automatic needle valve subassemblies, will enter cavity 246' through radially spaced holes 250', where it will actuate needle valve member 249' to move the same toward the left, as viewed in Figure 1, due to the pressure exerted by the fluid on needle valve member 249', so that the automatic needle valve is opened thereby. This will permit the hydraulic fluid to flow through communicating passages 259' into bore 261', from which it will flow through communicating passage 262', through radially spaced holes 67 and through the space formed between forwardly extending sleeve 59 and tubular member 63 into the rearward compartment of the hydraulic cylinder formed intermediate tubular members 41 and 63 and above the hydraulic piston ring assembly 43, 44, 45, 43', and 45'.

Thus the rate of advance of the spindle assembly is determined by the rate of flow of the hydraulic fluid through the automatic and the manual needle valves. During the initial advancement of the spindle assembly, which is desired to be relatively rapid in order to bring the spindle assembly to the work piece, the rate of flow of the hydraulic fluid is determined primarily by the automatic needle valve which is wide open at that time by reason of a relatively high camming surface of the camming elements in holes 502. This part of the cycle of operation may be considered the first part. Furthermore, the spindle rotating air motor will start to operate as soon as the rear end of sleeve member 140 advances beyond the forward end of sleeve portion 125.

As the spindle assembly advances, rods 501 and 501' also advance therewith since the latter are securely fastened to end member 88 as was fully explained above. The camming surface formed by camming elements 503 is so adjusted that as the spindle assembly approaches the work piece, the automatic needle valve 249 is closed or almost closed. This may be accomplished by letting the follower arm 523 of follower member 521 ride substantially on the surface of rod 501' and by adjusting the camming elements 503 in such a manner that the ends thereof which would be engaged by follower arm 523 do not extend beyond the surface of rod 501'. With automatic needle valve 249 substantially closed, the rate of advance is determined by the setting of the manual needle valve 222 by manual needle valve adjusting member 223. This part of the cycle of operation may be considered the second part, and may be used for drilling through the work piece which operation requires a relatively slower rate of advancement of the spindle assembly than for threading or tapping. A combination drill-tap cutting tool may be used in a reversing tapping attachment fastened in the air motor, which itself is housed in cavity 151 formed in tubular member 41.

After the drilling operation through the work piece is completed, which operation took place at the rate of advance as described above, it may become desirable to again speed up the rate of advance of the spindle assembly during the tapping operation which follows the drilling operation. In order to speed up the rate of advance of the spindle assembly at that point it becomes only necessary to adjust the camming elements 503 to be engaged by the follower arm 523 of the follower member 521 to produce a predetermined amount of camming so as to rotate the rod 33' clockwise as viewed from in front of the spindle assembly so as to reopen the automatic needle valve 249 a predetermined amount. This part of the cycle of operation, during which the rate of advance of the spindle assembly is controlled simultaneously by the manual and the automatic needle valve assemblies, may be used for purpose of tapping, and may be considered the third part.

As the spindle assembly advances still further and completes the tapping operation, cylindrical member 511 of poppet valve actuating member 507, which is fastened to rod 501' for movement therewith, will come in contact with actuating member 353 of poppet valve 347, and will depress the same.

Since compressed air was permitted to reach the interior of both poppet valve housing 318 and 319 through communicating passages 355 and 356 throughout the first, second and third parts of the cycle of operation, equilibrium of the air pressure had been re-established therein after the temporary unbalance which was created by the manual depressing of the actuating member 352 to start the cycle of operation. Thus no force existed by reason of any difference in air pressure in the poppet valve housings 318 and 319, and the pneumatic piston member was permitted to stay in the position shown in Figure 4, which it assumed after depressing the actuating member 352.

As soon as cylindrical member 511 depresses actuating member 553, compressed air will be permitted to escape from within poppet valve housing 319 through bore 341, countersunk portion 343 and cross-bore 345 thereby reducing the pressure within housing 319 so that an excess of pressure exists in poppet valve housing 318. The excess of pressure will produce a net force on the upper portion of the piston member 310 as viewed in Figure 4, and will urge the same to its lower position, opposite that shown in Figure 4.

As the piston member 310 moves downward, the piston ring assembly formed by elements 313', 314', 315', 316' and 317' will prevent compressed air from entering bore 308 through radially spaced holes 306 and groove 304. At the same time movement of the piston ring assembly formed by elements 313'', 314'', 315'', 316'', and 317'' to a position below groove 305, will permit compressed air to reach bore 309 through inlet port 354, through the space within bore 302 intermediate piston ring assemblies 313', 314', 315', and 313'', 314'', 315'', through bore 312, and through radially spaced holes 305. From bore 309, compressed air will pass into the forward compartment of the pneumatic cylinder formed within tubular members 34 and 20 and under piston ring assembly 35, 36, and 37 through the connecting bore provided in extension 364 of forward supporting bracket 21, thereby starting the rearward movement of the spindle assembly.

The diaphragm 374 together with quick exhaust port 373 permit almost instantaneous reversal of the movement of the spindle assembly since air flowing in a direction from the rearward compartment of the pneumatic cylinder into cavity 370 in extension 369 of rearward supporting bracket 25, will open diaphragm 374, and thereby permit air to escape from quick exhaust port 373 which might otherwise be compressed in the rearward compartment of the pneumatic cylinder by reason of the rearward movement of the spindle assembly.

Rearward movement of the spindle assembly is however resisted again by the hydraulic system since rearward movement of tubular member of hydraulic piston 41 which supports the piston ring assembly 43, 44, 45, 44', and 45' would tend to compress the hydraulic fluid present in the rearward compartment of hydraulic cylinder formed between tubular members 41 and 63 and the top of the piston ring assembly. Because of the relative incompressibility of the hydraulic fluid, the rate of retraction of the spindle assembly is, therefore, determined by the rate at which the fluid may escape from the rearward compartment of the hydraulic cylinder, which in turn is determined by the settling of the valves in the manual and automatic valve subassemblies 201' and 202'.

The hydraulic fluid will tend to escape from the rearward hydraulic cylinder compartment through the space formed between tubular member 63 and sleeve member 59, through radially spaced holes 67 and communicating passage 262' (Figure 2) and through bore 261' (Figure 1) into the upper valve assembly as viewed in Figure 1.

At that point, a portion of the hydraulic fluid will flow through holes 270' located in the periphery of retainer ring 237', through filter 235' and through diagonally opposite holes 207' into the space within the manual needle valve bearing member 217'. The hydraulic fluid will then pass through the opening formed between bore 221' and needle valve 222', the opening of which depends on the manual setting of the needle valve 222' by means of knurled adjusting member 223' which more or less opens the bore 221' by rotation thereof so that the rate of escape of the hydraulic fluid may be adjusted manually to any predetermined amount up to a maximum which is determined by the size of the bore 221'.

The hydraulic fluid will then pass through transverse bores 227', through the space formed between reduced diametric portion 228' of manual needle valve bearing member 217' and valve bearing member 204', through radially spaced holes 206' and through communicating passage 264 in transverse wall 203.

Another portion of the hydraulic fluid will fllow from bore 261' through communicating passage 259' into the interior of the automatic needle valve bearing member 258' from where it will tend to flow through the opening formed between bore 248' and automatic needle valve 249' at a rate dependent on the amount of opening thereat. The amount of opening, however, is in turn dependent on the displacement of piston member 252' and cylindrical shaft member 256' which is controlled by the amount of rotation of rod 33 which is translated into longitudinal movement by a finger member 513' (not shown) the extension 519' (not shown) of which engages the indentation 255' in piston member 252'. The amount of rotation of rod 33' is dependent on the position of a follower arm 523' (not shown) of follower member 521' (not shown). The finger member 513' and the follower member 521' are similar to corresponding members 513 and 521, and are fastened to rod 33' in a manner similar to the clamping of elements 513 and 521 on rod 33.

Moreover appropriate camming elements 503' may be provided in bores located at right angles to the set of holes in which set screws 502' are received, the set screws adjustably securing the camming elements in a manner similar to that described in connection with set screws 502 and camming elements 503.

Furthermore, the operation for actuation of the automatic needle valve subassembly 202' is similar to that described in connection with automatic needle valve subassembly 202, and a detailed description thereof is, therefore, not deemed necessary.

After passage through the opening formed between bore 248' and automatic needle valve 249', the hydraulic fluid will enter cavity 246' in automatic valve bearing member 240', from where it will flow through radially spaced holes 250' and through reduced diametric portion 251' of valve bearing member 240' into communicating passage 263.

Since communicating passages 263 and 264 are directly connected, as described above, the hydraulic fluid, after passage through the manual and the automatic needle valve subassemblies, will enter cavity 246 through radially spaced holes 250, where it will actuate needle valve member 249 to move the same toward the right, as viewed in Figure 1, due to the pressure exerted by the fluid on needle valve member 249, so that the automatic needle valve is thereby opened. This will permit the hydraulic fluid to flow through communicating passage 259 into bore 261, from which it will flow through communicating passage 262, through radially spaced holes 76 and through the space formed between tubular members 63 and 68 into the forward compartment of the hydraulic cylinder.

Thus the rate of retraction of the spindle assembly is also determined by the rate of flow of the hydraulic fluid through the automatic and the manual needle valves.

During the initial part of retraction, which corresponds to the backing out of the topping tool from the work piece, which may be considered the first part of the retraction cycle, little or no camming action is desired so that a slower rate of retraction may be obtained by reason of almost substantial closure of the automatic needle valve, which slower rate of retraction is thereby primarily controlled by the manual setting of manual adjusting member 223' which determines the amount of opening of the manual needle valve.

After the tool is backed out of the work piece, the rate of retraction, which may be considered the second part of the retracting cycle of operation, may be increased by appropriate amount of camming action through camming elements 503' which will open the automatic needle valve as was more fully described above.

For semi-automatic operation, i.e., for one-shot operation, the poppet valve housing 318 is rotated counterclockwise approximately 90° as viewed from the front so that actuating member 352 will not be depressed upon rearward movement of poppet valve actuating member 507. The cycle will not start again under those conditions until the actuating member 352 is manually depressed.

For fully automatic operation, the poppet valve housing 318 is left in the position indicated in Figure 1, whereby cylindrical member 511 may be used to automatically depress the actuating member 352 of poppet valve 346 upon rearward movement of the spindle assembly.

If it becomes desirable to drill accurately to predetermined depths in the work piece, the pressure sensitive poppet valve actuating member 400 shown in Figures 6 and 7 may be used, which may be mounted on rod 501' by an appropriate fastening device in such a manner that the right portion of the actuator 411, as viewed in Figure 7, will come into engagement with actuating member 353 of poppet valve 347.

The pressure sensitive poppet valve actuating must be interconnected with the hydraulic system. For that purpose threaded bores are provided in the top of the hydraulic valve assembly 200 (Figure 2) which are normally closed by threaded plug members 273 and 274.

A flexible or rigid connecting tube is inserted into bore 407 of compression nut 404. The other end of this tube is interconnected with the forward compartment of the hydraulic system by insertion into the bore normally closed by plug member 274. Thus the pressure which exists in the forward compartment of the hydraulic cylinder is also transmitted to the pressure sensitive poppet valve actuating member 400 through such tube.

At first, it is necessary to adjust ring 96 so that the maximum forward travel of the spindle assembly coincides with ring 96 abutting against stop ring 153. This may be easily done by rotation of knurled knob member 117, the rotation of which is transmitted to ring 96 by reason of key 98 in ring 96 which engages the keyway 99 provided in tubular sleeve member 100 which forms an integral part with knob member 117.

During advancement of the spindle assembly, the hydraulic fluid is continuously under pressure in the forward compartment of the cylinder so that actuator 411 is urged toward the left to the position shown in Fig. 7 against the spring pressure from spring 412. As soon as the ring 96 comes in contact with stop ring 153, the forward movement of the spindle is halted, and simultaneously therewith the pressure in the forward compartment of the hydraulic cylinder collapses. Collapse of the hydraulic pressure in the forward compartment of the hydraulic cylinder is also accompanied by collapse of the hydraulic pressure within the pressure sensitive poppet valve actuating member 400, so that actuator 411 thereof will move to the right under pressure exerted by spring 412 and the right face of actuator 411, as viewed in Fig. 7, depresses the actuating member 353 of poppet valve 347 in order to initiate retracting movement of the spindle assembly as was more fully described above.

By utilizing the pressure sensitive device, the hydropneumatic actuator will lend itself readily for operations which require drilling to accurate depths since a positive stop is provided for the advancing movement of the spindle and an almost instantaneously acting reversing mechanism is obtained thereby.

The air motor may be of the multi-speed type and may include a self-reversing mechanism for the combined drilling and tapping operations.

Moreover, the pressure sensitive actuator 400 may be interconnected in the rearward compartment of the hydraulic system, and may, for example, be used to actuate reversal of the spindle assembly movement in response to pressure increases in that compartment by using the left portion of actuator 411.

I claim:

1. In combination with a motor driven spindle assembly a hydro-pneumatic system comprising a first tubular member for said spindle assembly, a second tubular member coaxial with respect to said first member forming a cylinder for the hydraulic system, and a third tubular member coaxial with said second member forming a cylinder for said pneumatic system, piston means on said spindle assembly for each of said cylinders, interconnecting passage means between the two sides of the cylinder of the hydraulic system divided by one of said piston means, said interconnecting passage means including adjustable needle valve means, sleeve valve means in said pneumatic system, interconnected passage means connecting the two portions of the cylinder of said pneumatic system divided by the other of said piston means with said sleeve valve, means for initiating the forward movement of said spindle assembly with said pneumatic system, automatic means for reversing the direction of motion of said spindle assembly at a predetermined point in its movement in the first-mentioned direction, and further needle valve means in parallel with said first needle valve means operated by the movement of said spindle assembly to determine the opening of said further valve means, whereby the instantaneous position of both said needle valve means determines the rate of movement of said spindle.

2. In combination with a motor driven spindle assembly, a hydro-pneumatic actuator system comprising a first tubular member for said spindle, a second tubular member coaxial with respect to said first member forming a cylinder for the hydraulic system, and a third tubular member coaxial with said second member forming the cylinder for the pneumatic system, a first piston means secured to said first tubular member and cooperating with the hydraulic cylinder, a second piston means secured to said third tubular member and cooperating with the pneumatic cylinder, said third tubular member being affixed to and movable with the first tubular member, hydraulic means including manual rate adjusting means interconnecting the two parts of the hydraulic cylinder separated by said first piston means, and control valve means connected to the two parts of the cylinder of the pneumatic system separated by said second piston means for automatically advancing and retracting said spindle.

3. In combination with a motor driven spindle assembly a hydro-pneumatic system comprising a first tubular member for said spindle assembly, a second tubular member coaxial with respect to said first member forming a cylinder for the hydraulic system, and a third tubular member coaxial with said second member forming a cylinder for said pneumatic system, piston means on said spindle assembly for each of said cylinders, interconnecting passage means between the two sides of the cylinder of the hydraulic system divided by one of said piston means, said interconnecting passage means including adjustable needle valve means, sleeve valve means in said pneumatic system, interconnected passage means connecting the two portions of the cylinder of said pneumatic system divided by the other of said piston means with said sleeve valve, means for initiating the forward movement of said spindle assembly with said pneumatic system, automatic means for reversing the direction of motion of said spindle assembly at a predetermined point in its movement in the first mentioned direction, and further means in parallel with said needle valve means operated by the movement of said spindle assembly to determine the opening of said further means, whereby the instantaneous position of said valve means and said further means determines the rate of movement of said spindle.

4. In combination with a motor driven spindle assembly a hydro-pneumatic system comprising a first tubular member for said spindle assembly, a second tubular member coaxial with respect to said first member forming a cylinder for the hydraulic system, and a third tubular member coaxial with said second member forming a cylinder for said pneumatic system, piston means on said spindle assembly for each of said cylinders, interconnecting passage means between the two sides of the cylinder of the hydraulic system divided by one of said piston means, said interconnecting passage means including adjustable needle valve means, sleeve valve means in said pneumatic system, interconnected passage means connecting the two portions of the cylinder of said pneumatic system divided by the other of said piston means with said sleeve valve, means for initiating the forward movement of said spindle assembly with said pneumatic system, means for reversing the direction of motion of said spindle assembly at a predetermined point in its movement in the first mentioned direction, and further means in parallel with said needle valve, means operated by the movement of said spindle assembly to determine the opening of said further means, whereby the instantaneous position of said valve means and said further means determines the rate of movement of said spindle.

5. A hydro-pneumatic actuator system as set out in claim 2 wherein the control valve means includes further means for initiating the forward movement of said spindle assembly and automatic means for reversing the direction of motion of said spindle assembly at a predetermined point, the hydro-pneumatic system further including a pressure-responsive member in operative connection with the hydraulic cylinder, a portion of said member being engaged with said automatic means and movable in response to hydraulic pressure variations in the forward part of the hydraulic cylinder to actuate said automatic means and reverse the direction of movement of the spindle assembly.

6. A hydro-pneumatic actuator system as set out in claim 5 with the addition of stop means adjustably mounted on said spindle assembly to regulate the extent of advance of the latter.

7. In combination with a motor driven spindle assembly, a hydro-pneumatic actuator system comprising pneumatic means for advancing and retracting said spindle assembly, hydraulic means for determining the rate of advancing and retracting of said spindle assembly, means for adjusting the rate of advancing and retracting said spindle assembly, and sleeve valve means in said pneumatic system for automatically reversing the direction of movement of said spindle assembly, said sleeve valve means including a housing having a bore in which is slidably mounted a piston having spaced piston rings in engagement with the housing wall defining the bore, the bore being operatively connected to said pneumatic means for constantly maintaining compressed air in the valve bore, escape valves in said housing in communication with opposite ends of the bore and selectively operated to release air from either end thereof, thereby unbalancing the pneumatic equilibrium of the valve and effecting movement of said piston in the bore, the sleeve valve means further including passageways leading from said bore to the fore and aft portions of the pneumatic means, the passageways being alternately connected to the source of pneumatic pressure upon movement of said piston to advance or retract the spindle assembly, the means for automatically reversing the movement of said spindle assembly also including a means responsive to pressure variations in said hydraulic means to operate said automatic reversing means.

8. A combination according to claim 7, further comprising manual adjusting means for accurately determining the maximum advance of said spindle assembly.

9. In combination with a motor driven spindle assembly, a hydro-pneumatic actuator system comprising pneumatic means for advancing and retracting said spindle assembly, hydraulic means for determining the rate of advancing and retracting said spindle assembly including means for adjusting the rate of advancing said spindle assembly, said last named means including a manually set valve and a spring-tensioned valve in parallel realtionship, a rod having a cammed surface movable with the spindle, and a follower arm engaged with the cammed surface of said rod and with said spring-tensioned valve for varying the opening of the latter to control the rate of advance of said spindle upon actuation of the latter, and a second hydraulic unit comprising a manually set valve, a spring-tensioned valve, a rod having a cammed surface and a follower arm, all operatively connected, said unit being connected to the spindle assembly in reverse relationship with respect to the first unit, to control the rate of retraction of said spindle.

10. In combination with a motor driven spindle assembly, a hydro-pneumatic actuator system comprising pneumatic means for advancing and retracting said spindle assembly, and hydraulic means for determining the rate of advancing and retracting said spindle assembly including means for adjusting the rate of advancing said spindle assembly, said last named means including a manually set valve and a spring-tensioned valve in parallel relationship, a rod having a cammed surface movable with the spindle, the cammed surface of said rod being formed by camming elements inserted a predetermined distance into transverse bores in said rod, means engageable with said camming elements for adjustably securing the latter in the transverse bores, and a follower arm engaged with the cammed surface of said rod and with said spring-tensioned valve for varying the opening of the latter to control the rate of advance of said spindle upon actuation of the latter.

References Cited in the file of this patent

UNITED STATES PATENTS

| Number | Name | Date |
|---|---|---|
| 840,877 | Steedman | Jan. 8, 1907 |
| 1,007,377 | Nielsen | Oct. 31, 1911 |
| 1,283,179 | Hennebohle | Oct. 29, 1918 |
| 1,812,533 | Hunt | June 30, 1931 |
| 1,912,184 | Ferris | May 30, 1933 |
| 1,923,595 | Temple | Aug. 22, 1933 |
| 2,040,580 | Vorech | May 12, 1936 |
| 2,063,414 | Tweddell | Dec. 8, 1936 |
| 2,326,498 | Rodal | Aug. 10, 1943 |
| 2,388,662 | Anderson | Nov. 13, 1945 |
| 2,444,228 | Huthsing | June 29, 1948 |
| 2,470,415 | Seborg | May 17, 1949 |
| 2,568,450 | Hjarpe | Sept. 18, 1951 |
| 2,580,751 | Fletcher | Jan. 1, 1952 |
| 2,641,279 | Baldwin | June 9, 1953 |
| 2,655,058 | Eschenburg | Oct. 13, 1953 |
| 2,664,859 | Green | Jan. 5, 1954 |